(12) United States Patent
Roodenburg et al.

(10) Patent No.: US 9,669,320 B2
(45) Date of Patent: Jun. 6, 2017

(54) OBSERVATION WHEEL TYPE RIDE WITH AUXILIARY BEARINGS TO SUPPORT THE MAIN SHAFT IN CASE OF FAILURE OF THE MAIN BEARINGS

(71) Applicant: VEKOMA RIDES ENGINEERING B.V., Vlodrop (NL)

(72) Inventors: Hendrik Ficus Roodenburg, Krimpen Aan Den Ijssel (NL); Johan Willem Philippen, Schinveld (NL)

(73) Assignee: VEKOMA RIDES ENGINEERING B.V., Vlodrop (NL)

( * ) Notice: Subject to any disclaimer, the term of this patent is extended or adjusted under 35 U.S.C. 154(b) by 0 days.

(21) Appl. No.: 15/031,425

(22) PCT Filed: Oct. 21, 2014

(86) PCT No.: PCT/NL2014/050734
§ 371 (c)(1),
(2) Date: Apr. 22, 2016

(87) PCT Pub. No.: WO2015/060720
PCT Pub. Date: Apr. 30, 2015

(65) Prior Publication Data
US 2016/0256787 A1 Sep. 8, 2016

(30) Foreign Application Priority Data

Oct. 25, 2013 (NL) ..................................... 2011678

(51) Int. Cl.
*A63G 27/00* (2006.01)
*F16C 21/00* (2006.01)
(Continued)

(52) U.S. Cl.
CPC .............. *A63G 27/00* (2013.01); *F16C 19/52* (2013.01); *F16C 21/00* (2013.01); *F16C 39/02* (2013.01);
(Continued)

(58) Field of Classification Search
CPC ....... A63G 27/00; F16C 19/00; F16C 19/188; F16C 2300/14; F16C 2316/00; B66D 1/00; B66D 1/30
(Continued)

(56) References Cited

U.S. PATENT DOCUMENTS 3,226,113 A * 12/1965 Mercer .................. A63G 27/00
472/3
4,664,539 A 5/1987 Li
(Continued)

FOREIGN PATENT DOCUMENTS

CN 101912686 A 12/2010
DE 26 34 776 A1 2/1978
(Continued)

*Primary Examiner* — Kien Nguyen
(74) *Attorney, Agent, or Firm* — Birch, Stewart, Kolasch & Birch, LLP

(57) ABSTRACT

An observation wheel type ride includes a wheel, multiple passenger cabins supported by the wheel, a drive mechanism for rotating the wheel about its rotational axis, and a support structure that supports the wheel. The wheel furthermore includes two first bearings, provided with a first bearing locking mechanism, and two second bearings, provided with a second bearing locking mechanism. Each bearing locking mechanism can selectively be converted between a locking condition, in which it prevents rotational movement of a bearing inner ring relative to a bearing outer ring, and an unlocking condition, in which it allows for rotational movement of the first bearing inner ring relative to the first bearing outer ring. Providing the second bearings allows for rotational movement of the wheel about the rotational axis (Continued)

of its support axle when the first bearing locking mechanisms are in their locking condition.

11 Claims, 3 Drawing Sheets

(51) Int. Cl.
  *F16C 39/02* (2006.01)
  *F16C 19/52* (2006.01)
(52) U.S. Cl.
  CPC ...... *F16C 2300/14* (2013.01); *F16C 2316/00* (2013.01)
(58) Field of Classification Search
  USPC .......................................... 472/29, 30, 44, 45
  See application file for complete search history.

(56) References Cited

U.S. PATENT DOCUMENTS

| | | | | |
|---|---|---|---|---|
| 4,960,275 A | * | 10/1990 | Magon | A63G 27/00 472/13 |
| 4,988,089 A | * | 1/1991 | Knijpstra | A63G 27/00 472/3 |
| 9,114,322 B2 | * | 8/2015 | Silberman | A63G 27/00 |
| 2013/0202236 A1 | | 8/2013 | Nygaard | |

FOREIGN PATENT DOCUMENTS

| | | |
|---|---|---|
| DE | 10 2011 075 049 A1 | 11/2012 |
| FR | 2.211.999 | 7/1974 |
| JP | 64-40709 A | 2/1989 |
| JP | 20 2006 017 416 A1 | 1/2007 |
| JP | 2009-254577 A | 11/2009 |
| WO | WO 00/20769 A1 | 4/2000 |
| WO | WO 2012/080983 A1 | 6/2012 |

* cited by examiner

OBSERVATION WHEEL TYPE RIDE WITH AUXILIARY BEARINGS TO SUPPORT THE MAIN SHAFT IN CASE OF FAILURE OF THE MAIN BEARINGS

The present invention relates to an observation wheel type ride according to the preamble of claim 1.

An attraction of this type is also known by the name "Ferris wheel", and is for example known from JP2009-254577. Such a wheel can have a height of more than 100 m. The wheel is provided with a central axle that bears on sheer legs on either side. High forces act on such a shaft. In the case of a wheel that is, for example, 130 m high the weight of the rotating part is, for example, 1500 tonnes. Consequently, the life of the bearing in the shaft is limited and critical. Typically, rolling bearings are used to rotatably support the axle of the wheel. Such rolling bearings comprise an inner ring and an outer ring and multiple rolling bodies provided between the inner ring and the outer ring, which rolling bodies are held in a cage to position them relative to each other. When for example the cage brakes down, the rolling bearing may get stuck and block rotational movement of the bearing and thus the wheel. Fixing or replacing these bearing is a complicated task that takes a lot of time. Since the wheel can no longer be rotated, the passengers have to be evacuated from the cabins.

Various authorities have laid down that there must be an evacuation plan for the event that the bearing fails. In such a case further rotation of the wheel is no longer possible. In the case of a wheel that is not that high this does not constitute a problem because in this case the users of the attraction can be removed from the wheel with the aid of a simple (building) crane. However, in the case of a wheel of greater height a crane cannot easily be made available quickly, thus there are serious difficulties in being able to guarantee evacuation under all circumstances should problems arise. For example, not always is there enough space for mounting a crane to enable the evacuation.

It is an object of the invention to obviate the problems described hereinabove and in particular to facilitate evacuation of users of an attraction in case of a failing bearing, in particular in combination with large sized observation wheels.

According to the present invention, this object is achieved by providing a ride according to claim 1.

An observation wheel type ride according to the invention comprises:
  A wheel, which wheel comprises:
    A wheel rim,
    A wheel hub, which wheel hub has a rotational axis which coincides with a rotational axis of the wheel;
    Wheel spokes, which wheel spokes extend between the wheel hub and the wheel rim in a radial direction;
  Multiple passenger cabins, which passenger cabins are supported by the wheel;
  A drive mechanism, which drive mechanism is configured for rotating the wheel about its rotational axis;
  A support structure, which support structure supports the wheel; and
  Two first bearings, the first bearings each comprising an inner bearing ring and an outer bearing ring, and which two first bearings enable rotational movement of the wheel about its rotational axis.

An observation wheel according to the invention is characterized in that it further comprises:
  A first bearing locking mechanism for each first bearing, which first bearing locking mechanism can selectively be converted between a locking condition, in which it prevents rotational movement of the first bearing inner ring relative to the first bearing outer ring, and an unlocking condition, in which it allows for rotational movement of the first bearing inner ring relative to the first bearing outer ring;
  Two second bearings, which second bearings each comprise an inner bearing ring and an outer bearing ring or outer bearing semi ring, and which second bearings enable rotational movement of the wheel about its rotational axis when the first bearing locking mechanisms are in their locking condition; and
  A second bearing locking mechanism for each second bearing, which second bearing locking mechanism can selectively be converted between a locking condition, in which it prevents rotational movement of the second bearing inner ring relative to the second bearing outer ring, and an unlocking condition, in which it allows for rotational movement of the second bearing inner ring relative to the second bearing outer ring.

Thus, according to the invention, the wheel is provided with two first bearings and two second bearings, and with locking mechanisms associated with each of those bearings. The locking mechanisms are each configured such that they can selectively be converted between a locking condition, in which the locking mechanism blocks rotational movement of the bearing it is associated with, and an unlocking condition, in which the locking mechanism allows rotational movement of the bearing it is associated with.

More in particular, when in the locking condition, the locking mechanism prevents rotational movement of the bearing inner ring relative to the bearing outer ring, and in the unlocking condition, it allows for rotational movement of the bearing inner ring relative to the bearing outer ring.

In normal use, the wheel is run on either the first or second bearings while rotational movement of the other bearings, i.e. the second or first bearings respectively, is locked by the associated locking mechanisms. The invention allows for switching from the first pair of bearings to using the second pair of bearings when one or both bearing of the first pair fails during use. Thus, the wheel can still be rotated after bearing failure, which allows for positioning the passenger cabins near the ground to facilitate evacuation, preferably allows for bringing the passenger cabins in a station for boarding/unboarding as during normal use, thus allowing the passengers to exit as under normal conditions.

For example, when the first bearings are used as main bearings, in normal use the wheel is run on the first bearings. In this case, the second bearings are the auxiliary bearings, of which, during normal use rotational movement is locked by the second bearings locking mechanisms. When one of the first bearings fails, or even both first bearings fail, the first bearings locking mechanisms are converted from their unlocking condition into their locking condition to prevent any further rotational movement of the failed bearing(s). Furthermore, the second bearing locking mechanisms are converted from their locking condition into their unlocking condition to take over rotational supporting the wheel, and thus allow for rotation of the wheel even though one or both first bearings have failed.

It is noted that the bearing locking mechanisms are used for switching between the bearings to be used to rotatably support the wheel. Separate brake systems are provided for reducing and preventing movement of the wheel during normal use. In an embodiment, a brake system is incorporated in the drive for rotating the wheel.

Typically, one pair of bearings are the main bearings and rotatably support the wheel during normal use, and the other pair of bearings are auxiliary bearings which are only used when one of the main bearings fails. In both cases, i.e. when the wheel is rotatably supported by the first or second bearings, the wheel is driven by the drive and rotation is stopped using a brake system.

Typically, each first bearing is provided with an associated second bearing to replace it during failure. The associated second bearing is provided in the vicinity of the first bearing such that the first and its associated second bearing are more or less loaded in the same way when rotationally supporting the wheel. Preferably the first and its associated second bearing are integrated in a combined bearing, for example with the first bearing provided concentrically within the second bearing.

It is noted that when the wheel is provided with two first bearings and two second bearings, and one of the first bearings fails, preferably only that first bearing is blocked and only the one associated second bearing is unblocked. Thus, the wheel can be rotated on the one functioning first bearing and the one unblocked second bearing. Alternatively, when one first bearing fails, both first bearings are blocked and both second bearings are unblocked such that the wheel can be rotated on both second bearings.

In a further embodiment according to the invention:
the wheel hub has an axial opening, the support structure comprises a support frame and a support axle, which support axle extends through said axial opening provided in the wheel hub and is supported by the support frame;
the first bearings are provided at opposite ends of the wheel hub and between the wheel hub and the support axle, to rotatably support the wheel hub on the support axle and thus enable rotational movement of the wheel about its rotational axis.
the second bearings are each provided between the support axle and the support frame, to rotatably support the support axle on the support frame, and to thus enable rotational movement of the wheel about its rotational axis when the first bearing locking mechanisms are in their locking condition.

In such an embodiment, the support structure is provided with a support axle which extends through a central opening of the hub of the wheel. The wheel, more in particular the hub of the wheel, is rotatably supported on the axle via the first bearings. The axle itself is rotatably supported on the rest of the support structure via the second bearings.

Typically, the support axle extends on both sides of the wheel, and the supports structure is provided on both sides of the wheel, for example in the form of a frame work or pylons, to support the ends of the axle. Other configurations of the support structure and axle are however possible.

In one working condition, the second bearing locking mechanisms are in their locking condition such that rotation of the axle relative to the support structure is blocked. At the same time, the first bearing locking mechanisms are in their unlocking condition such that the wheel can be rotated about the support axle. In case one of the first bearings fails, the first bearings are locked using the first bearing locking mechanisms, and the second bearing mechanisms are converted into their unlocking condition. In this working condition, the wheel can not be rotated relative to the support axle. However, both the wheel and the support axle can still be rotated in combination, because the support axle is rotatably supported by the second bearings.

In an alternative embodiment according to the invention:
the wheel hub has an axial opening;
the structure comprises a support frame and a support axle, which support axle extends through said axial opening provided in the wheel hub and is supported by the support frame;
the first bearings are provided at opposite ends of the wheel hub and between the wheel hub and the support axle, to rotatably support the wheel hub on the support axle and thus enable rotational movement of the wheel about its rotational axis,
the second bearings are each provided between the wheel hub and the support axle and between one of the first bearings and the wheel hub, such that they support the wheel hub and in turn are supported by the first bearings, to thus enable rotational movement of the wheel about its rotational axis when the first bearing locking mechanisms are in their locking condition.

In this embodiment, both the first and the second bearings are provided between the hub and the support axle. Furthermore, the second bearings are provided between the one of the first bearings and the wheel hub. The first and second bearing thus essentially form a double bearing, the double bearing comprising an inner bearing, i.e. the first bearing, and an outer bearing, i.e. the second bearing.

In this embodiment, independent of which set is rotatably supporting the hub, the wheel will be rotated about the support axle. The latter can thus be fixed to the rest of the support structure. Such an embodiment is especially advantageous when the support structure only supports one end of the support axle. For example, when the support structure comprise a pylon or a single frame work one side of the wheel only. Other configurations of the support structure and axle are however possible.

In one working condition, the second bearing locking mechanisms are in their locking condition such that rotation of the second bearing, more in particular the second bearing inner ring, relative to the hub is blocked. At the same time, the first bearing locking mechanisms are in their unlocking condition such that the wheel, and the locked second bearings, can be rotated about the support axle.

In case one of the first bearings fails, the first bearings are locked using the first bearing locking mechanisms. Thus, the first bearing outer bearing ring can no longer be rotated about the support axle and the first bearing no longer rotatably supports the wheel. However, when the second bearing mechanisms are converted into their unlocking condition, the wheel can again be rotated about its rotational axis.

In an alternative embodiment according to the invention:
the wheel hub extends on opposites sides of the wheel;
the support structure comprises a support frame, which support frame supports opposite ends of the wheel hub;
the first bearings are provided at opposite ends of the wheel hub and between the wheel hub and the support frame, to rotatably support the wheel hub on the support frame and thus enable rotational movement of the wheel about its rotational axis,
the second bearings are provided at opposite ends of the wheel hub and between one of the first bearings and the support frame, such that the rotatably support the first bearings and thus the wheel hub on the support frame, to thus enable rotational movement of the wheel about its rotational axis when the first bearing locking mechanisms are in their locking condition.

In this embodiment, both the first and the second bearings are provided between the hub and the support structure, there is not support axle provided. Furthermore, the second bearings are provided between the one of the first bearings and the support structure. Thus, also in this embodiment, the first and second bearing essentially form a double bearing, the double bearing comprising an inner bearing, i.e. the first bearing, and an outer bearing, i.e. the second bearing.

Since both bearings are provided between the hub and the support structure, both bearings can be easily reached. This allows for easy access to the locking mechanisms, and facilitates maintenance and replacement, for example in case of failure, of the bearings. In contrast, when one or both bearings are provided between a support axle and the hub of the wheel, the support structure blocks easy access to the bearings, for example for replacing parts using a crane.

In one working condition, the second bearing locking mechanisms are in their locking condition such that rotation of the second bearing, more in particular the second bearing inner ring, relative to the supports structure is blocked. At the same time, the first bearing locking mechanisms are in their unlocking condition such that the wheel, can be rotated about the support axle.

In case one of the first bearings fails, the first bearings are locked using the first bearing locking mechanisms. Thus, the first bearing outer bearing ring can no longer be rotated relative to the hub and the first bearing no longer rotatably supports the wheel. However, when the second bearing mechanisms are converted into their unlocking condition, the wheel and the locked first bearings can again be rotated about the rotational axis of the wheel.

In a further embodiment of an observation wheel according to the invention, in which the second bearings are each provided between the wheel hub and the support axle and between one of the first bearings and the wheel hub, or in an embodiment in which the second bearings are provided at opposite ends of the wheel hub and between one of the first bearings and the support frame, the second bearings are each provided concentric with the first bearings, and the first bearings outer rings and the second bearings inner rings are combined into intermediate bearing rings. Thus, first and second bearings are combined in a single bearing, this combined bearing comprising an inner and outer bearing the inner and outer bearing sharing the intermediate bearing ring. The intermediate bearing ring in which elements of both bearings are integrated, allows for a combined bearing that is more compact than providing two separate bearings.

In a further embodiment according to the invention, the second bearings are friction bearings, and the second bearings outer rings each comprise a semi ring support section, which is part of the support structure for rotatably supporting the second bearing inner rings, and a semi ring clamp section, which is part of the second bearing blocking mechanism, which blocking mechanism further comprise clamping devices for pulling the clamp section towards the support section to clamp the second bearing inner ring between the clamp section and the support section to thus block rotation of the second bearing inner ring relative to the second bearing outer ring.

In such an embodiment, the second bearing comprises essentially two halves, one lower half for rotatably supporting the second bearing inner ring, and an upper half, which can be used for clamping the second bearing inner ring to prevent movement of the second bearing inner ring relative to the second bearing outer ring. Thus, the second bearing blocking mechanism is at least partially integrated with the bearing, which allows for a compact configuration of the combined second bearing and second bearing locking mechanism.

In a further embodiment of an observation wheel according to the invention, the inner bearings and one of the outer bearings are provided concentric and in a common plane.

In a further embodiment of an observation wheel according to the invention, the main bearings, i.e. the bearings used during normal use are rolling bearings, and the bearings used in emergency situations, i.e. the auxiliary bearings, are friction bearings for rotating the wheel when one or both of the rolling bearings break(s) down.

In a further embodiment of an observation wheel according to the invention, the first bearings are rolling bearings, for rotating the wheel during normal use, and the second bearings are friction bearings for rotating the wheel when one or both of the rolling bearings break(s) down.

In a further embodiment of an observation wheel according to the invention, the first bearing blocking mechanism comprise a flange provided on the support axle, which flange extends in a radial direction adjacent the first bearing, and which flange can be fixed to the first bearing outer bearing ring to block rotational movement of that first bearing outer ring relative to the support axle.

The invention furthermore provides a method for providing an evacuation modus for an observation wheel type ride, the method comprising:
  providing an observation wheel type ride according to the invention,
  using the first or the second bearings as main bearings, and the other bearings as auxiliary bearings,
  rotating the wheel about its rotational axis using the main bearings, with the bearing locking mechanisms of the main bearings in their unlocking condition and the bearing locking mechanisms of the auxiliary bearings in their locking condition, thus using the main bearings to enable rotational movement of the wheel;
  when at least one of the main bearings fails, providing an evacuation modus by:
  optionally: rotating the wheel about its rotational axis to correctly position the main bearing locking mechanism of at least the failed main bearing for converting it from its unlocking condition into its locking condition;
  stop rotating the wheel about its rotational axis;
  converting at least the main bearing locking mechanism of the failed main bearing from its unlocking condition, in which it allows for rotational movement of the main bearing inner ring relative to the main bearing outer ring, into its locking condition, in which it prevents rotational movement of the main bearing inner ring relative to the main bearing outer ring;
  converting at least the auxiliary bearing locking mechanism of the auxiliary bearing associated with the failed main bearing from its locking condition, in which it prevents rotational movement of the auxiliary bearing inner ring relative to the auxiliary bearing outer ring, into its unlocking condition, in which it allow for rotational movement of the auxiliary bearing inner ring relative to the auxiliary bearing outer ring; and
  in the evacuation modus rotating the wheel about its rotational axis, to bring the passenger cabins in a position for evacuating passengers from the cabins, using one or both auxiliary bearings to enable rotational movement of the wheel.

A method for evacuating passengers from passenger cabins of an observation wheel type ride according to the invention, comprises providing an observation wheel type ride with first and second bearings. Of these bearings either the first or second bearings are used as main bearings for rotating the wheel under normal circumstances and the other bearings are used as auxiliary bearings for rotating the wheel when one or both of the main bearings fails.

Thus the invention allows for providing an evacuation modus in which the wheel of the wheel type ride is no longer rotationally supported by one or both main bearings, but by one or both auxiliary bearings, or by one main bearing in combination with one auxiliary bearing. Thus the in the evacuation modus the wheel can still be rotated in a controlled manner even though at least one of the main bearings has failed.

To enable controlled rotation of the heel, the first and second bearings are provided with locking mechanisms, for blocking rotational movement of the bearings. Preferably, when the first bearings are used for rotating the wheel, the second bearings are locked, and when the second bearings are used for rotating the wheel the first bearings are locked.

Either the first or the second bearings are the main bearings for rotating the wheel under normal circumstances. The other bearings are auxiliary bearings, which are in principle only used when one or more of the main bearings fails. Preferably the main bearings are roller bearings and the auxiliary bearings are friction bearings.

In a further preferred embodiment of an observation wheel according to the invention, the friction bearings are provided with integrated locking mechanism, i.e. the second bearings outer rings each comprise a semi ring support section, which is part of the support structure for rotatably supporting the second bearing inner rings, and a semi ring clamp section, which is part of the second bearing blocking mechanism, which blocking mechanism further comprises a clamping device for pulling the clamp section towards the support section to clamp the second bearing inner ring between the clamp section and the support section to thus block rotation of the second bearing inner ring relative to the second bearing outer ring.

When one of the main bearings fails such that it can no longer be rotated, it may not be necessary to convert its locking mechanism from its unlocked condition into its locked condition. Simply unlocking the locking mechanism of the associated auxiliary bearing is in this case sufficient for allowing the wheel to be rotated and evacuate its passengers.

Advantageous embodiments of the observation wheel type ride according to the invention and the method according to the invention are disclosed in the subclaims and in the description, in which the invention is further illustrated and elucidated on the basis of a number of exemplary embodiments, of which some are shown in the schematic drawing.

BRIEF DESCRIPTION OF THE DRAWINGS

In the drawings.

FIG. 7 shows the hub of FIG. 5 positioned on a support structure, which is depicted partially in see through.

FIG. 1 shows a schematic side view of an observation wheel type ride 1 according to the invention. It comprises a wheel 2, multiple passenger cabins 3 supported by the wheel, a drive mechanism 4 configured for rotating the wheel about its rotational axis, and a support structure 5. The figure furthermore shows a station 6 which allows for passengers to embark and disembark passenger cabins located at bottom end of the wheel.

Figure 1:
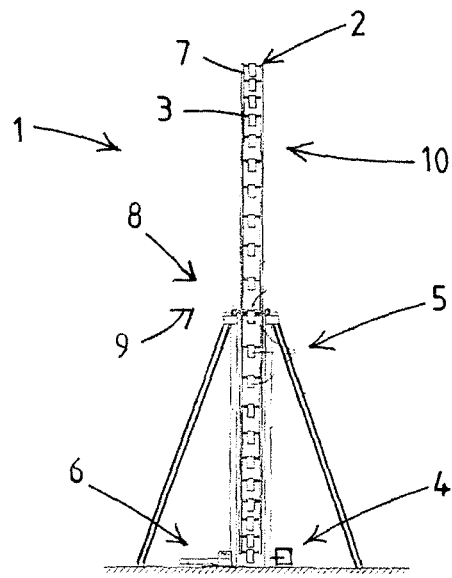
FIG. 1 shows a schematic side view of an observation wheel type ride.

The wheel 2 is rotatably supported by the support structure 5, in the particular embodiment shown the support structure comprises support frames on opposite sides of the wheel. It is noted that other types of support structures are possible, for example a single side support of the wheel instead of support on both sides. Also, the support structure can consist of different types of support frames, for example a support frame comprising multiple rods forming a framework, a support frame comprising one or more pylons and/or wires, etc.

The wheel 2 comprises a wheel rim 7. In the particular embodiment shown, the drive mechanism 4 is provided on the ground and engages the rim of the wheel for rotating the wheel. In an alternative embodiment, the drive is provided on the support structure and engages the wheel near the rotational axis of the wheel for rotating the wheel. For example, the drive mechanism can be supported by the support structure such that it engages an axis that rotationally supports the wheel, and rotate the wheel by rotating said axis. In another embodiment, the drive mechanism is provided on the ground and is linked, for example using a chain, with an axis rotationally supporting the wheel. Other configurations of the drive are also possible The wheel 2 furthermore comprises a wheel hub 8, which wheel hub has a rotational axis 9 which coincides with a rotational axis of the wheel. Wheel spokes 10, not shown in FIG. 1, extend between the wheel hub 8 and the wheel rim 7 in a radial direction. The wheel spokes can be rods and/or cables or wires, etc.

To rotatably support the wheel, bearings are provided between the wheel 2 and the support structure 5. The invention allows for alternative configurations of these bearings, which will be explained in more detail with references to the alternative embodiments shown in FIGS. 2, 3 and 4. In general, the invention provides an observation wheel type ride comprising two first bearings and two second bearings. Typically, the bearings each comprise an inner bearing ring and an outer bearing ring, which inner bearing ring is rotationally supported in the outer bearing ring. The bearings enable rotational movement of the wheel about its rotational axis.

The observation wheel according to the invention further comprises a first bearing locking mechanism for each first bearing, and a second bearing locking mechanism for each second bearing.

The bearing locking mechanisms can selectively be converted between a locking condition, in which they prevent rotational movement of the bearing inner ring relative to the bearing outer ring of the bearing they are associated with, and an unlocking condition, in which they allow for rotational movement of the bearing inner ring relative to the bearing outer ring of the bearing they are associated with.

The bearings are furthermore provided such that the second bearings enable rotational movement of the wheel about its rotational axis when the first bearing locking mechanisms are in their locking condition, and the first bearings enable rotational movement of the wheel about its rotational axis when the second bearing locking mechanisms are in their locking condition.

Thus, according to the invention, the wheel is provided with two first bearings and two second bearings, and with locking mechanisms associated with each of those bearings. The locking mechanisms are each configured such that they can selectively be converted between a locking condition, in which the locking mechanism blocks rotational movement of the bearing it is associated with, and an unlocking condition, in which the locking mechanism allows rotational movement of the bearing it is associated with.

In normal use, the wheel is run on either the first or second bearings while rotational movement of the other bearings, i.e. the second or first bearings, is locked by their associated locking mechanisms. The invention allows for switching from the first pair of bearings to using the second pair of bearings when one or both bearing of the first pair fails during use. Thus, the wheel can still be rotated after bearing failure, which allows for positioning the passenger cabins near the ground to facilitate evacuation, preferably allows for bringing the passenger cabins in a station for boarding/unboarding during normal use, thus allowing the passengers to exit as under normal, or close to normal, conditions.

Figure 2:
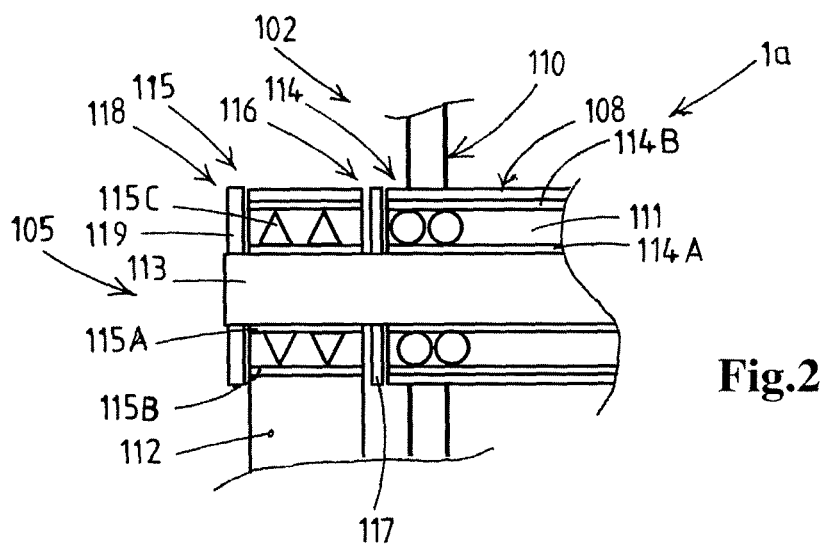
FIG. 2 shows a schematic view in cross section of a first and second bearing of a first embodiment of an observation wheel type ride according to the invention.

FIG. 2 shows a detail in cross section of an embodiment of an observation wheel type ride 101 similar to the one shown in FIG. 1. More in particular, FIG. 2 shows a first configuration of first and second bearings according to the invention. It is noted that the configuration of the bearings can also be applied in other types of observation wheels than the one shown in FIG. 1.

The particular embodiment shown in FIG. 2 comprises a wheel, which wheel is provided with a wheel hub. The figure shows a section of the wheel, more in particular an end of a wheel hub 108, and the ends of two wheel spokes 110 connected with the wheel hub 108. The wheel hub 108 is provided with an axial opening 111.

FIG. 2 furthermore shows part of an upper end of a support structure 105, which support structure comprises a support frame 112 and a support axle 113. Of the support axle 113 one end is shown. The support axle 113 extends through the axial opening 111 provided in the wheel hub 108. The ends of the support axle 113 extend outside the wheel hub 111, and are received in second bearings 115. Between the support axle 113 and the wheel hub 108 are furthermore provided first bearings 114.

In FIG. 2 the first bearings 114 are shown in cross section. The first bearings 114 are provided at opposite ends of the wheel hub 108 and between the wheel hub 108 and the support axle 113, to rotatably support the wheel hub on the support axle and thus enable rotational movement of the wheel about the support axle, and thus about its rotational axis. The first bearings 114 comprise a first bearing inner ring 114A and a first bearing outer ring 114B. The first bearing inner ring 114A is fixed to the support axle 113, and the first bearing outer ring 114B B is fixed to the wheel hub 108.

In the particular embodiment shown, the first bearings 114 are roller bearings. In the particular embodiment shown the first bearing inner ring 114A is fixed to the support axle 113, the first bearing outer ring 114B is fixed to the hub, and rolling bodies 114c are provided between the first bearing inner ring and first bearing outer ring. Thus, when the support hub 108 is rotated about its rotational axis, a bearing surface of the first bearing outer ring 114B slides over the rolling bodies 114C, which roll over a bearing surface of the first bearing inner ring 114A.

Furthermore, in the particular embodiment shown the first bearings 114 are provided with a first bearing locking mechanism 116 comprising a flange 117. The flanges 117, of which one is shown, are each provided on the support axle 113 adjacent a first bearing 114. Each flange 117 has a disc shaped flange body provided with openings along its outer circumference, which openings are configured for receiving pins in a direction substantially parallel to the rotational axis of the support axle 113. The openings provided in the flange body correspond with openings in the first bearing outer ring 114B.

The first bearing locking mechanism furthermore comprises pins, which pins can be inserted in the openings of the flange body such that they engage the corresponding openings in the first bearing outer ring. By inserting the pins into the openings of flange body and first bearing outer ring, the first bearing is converted from its unlocking condition into its locking condition. Because the first bearing outer ring 114B is fixed to the hub 108 inserting the bolts does not only block rotational movement of the first bearing outer ring relative to the first bearing inner ring, but also rotational movement of the hub 108 relative to the support axle 113.

Alternatively the openings for receiving the bolts can for example be provided in the hub instead of in the first bearing outer ring. In a preferred embodiment, the openings in the first bearing outer ring, or in the hub, are wired and the pins are bolts configured to engage those wired openings. Other embodiments of a locking mechanism can also be used.

According to the invention, in addition to the first bearings, second bearings are provided. In FIG. 2 the second bearings 115 are shown in cross section. These second bearings 115, of which one is shown, are each provided between the support axle 113 and the support frame 112 of the support structure 105, to rotatably support the support axle on the support frame. The second bearings 115 comprise a second bearing inner ring 115A and a second bearing outer ring 115B. The second bearing inner ring 115A is fixed to the support axle 113, and the second bearing outer ring 115B is fixed to the support frame 112.

In the particular embodiment shown, the second bearings 115 are friction type bearings, also known as plain bearings. These types of bearings are normally not used for rotationally supporting the wheel of a wheel type ride since they are less suited for providing a supple ride in combination with a low driving force in comparison with rolling bearings.

In the particular embodiment shown the second bearing inner ring 115A is fixed to the support axle 113, and is provided with a layer of low friction material 115C. The second bearing outer ring 115B is fixed to the support structure 105, more in particular to the support frame 112, and has a bearing surface that engages the layer of low friction material 115C. Thus, when the support axle 113 is rotated about its rotational axis the low friction material 115C, fixed to the second bearing inner ring 115A slides over the bearing surface of the second bearing outer ring 115B.

Furthermore, in the particular embodiment shown the second bearings 115 are provided with a second bearing locking mechanism 118 comprising a flange 119. The flanges 119, of which one is shown, are each provided at the end of the support axle 113 adjacent the second bearing 115. Each flange 119 has a disc shaped flange body provided with openings along its outer circumference, which openings are configured for receiving pins in a direction substantially parallel to the rotational axis of the support axle 113. The openings provided in the flange body correspond with openings in the second bearing outer ring 115B.

The second bearing locking mechanism furthermore comprises pins, which pins can be inserted in the openings of the flange body such that they engage the corresponding openings in the second bearing outer ring. By inserting the pins into the openings of flange body and second bearing outer ring, the second bearing is converted from its unlocking condition into its locking condition. Because the second bearing outer ring 115B is fixed to the support frame 112 inserting the bolts does not only block rotational movement of the second bearing outer ring relative to the second bearing inner ring, but also blocks rotational movement of the support axle relative to the support frame.

In a preferred embodiment, the openings in the second bearing outer ring are wired, and the pins are bolts configured to engage those wired openings. Other embodiments of a locking mechanism can also be used.

Thus, in the particular embodiment according to the invention shown in FIG. 2, the wheel 102, more in particular the wheel hub 108, is rotatably supported on the support axle 113 via first bearings 114, and the support axle 113 is in turn rotatably supported on the support structure 105, more in particular on the support frame 112, via second bearings 115. By thus providing the wheel with a hub which is rotatably supported on the support axle, which in turn is rotatably supported on the support frame, the wheel can be rotated using either the first or the second bearings. In the particular embodiment shown, the first bearings are roller bearings and function as the main bearings. The second bearings are friction bearings and functions as the auxiliary- or back up bearings. The second bearings are to be used when one or both of the first bearings brakes or brake down.

Figure 3:
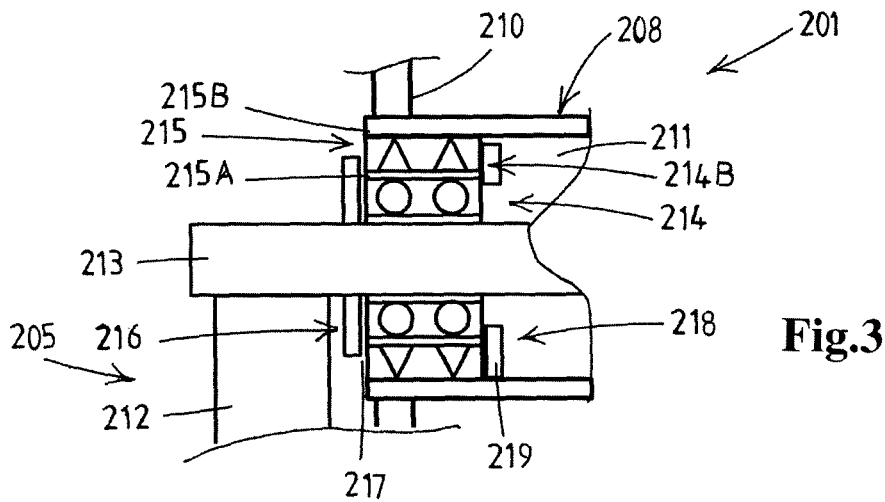
FIG. 3 shows a schematic view in cross section of a first and second bearing of a second embodiment of an observation wheel type ride according to the invention.

FIG. 3 shows a detail in cross section of an embodiment of an observation wheel type ride 201 similar to the one shown in FIG. 1. More in particular, FIG. 3 shows a second configuration of first and second bearings according to the invention. It is noted that the configuration of the bearings can also be applied in other types of observation wheels than the one shown in FIG. 1.

The particular embodiment shown in FIG. 3 comprises a wheel, which wheel is provided with a wheel hub 208. The figure shows a section of the wheel, more in particular an end of a wheel hub 208, and the ends of two wheel spokes 210 connected with the wheel hub 208. The wheel hub 208 is provided with an axial opening 211.

FIG. 3 furthermore shows an upper end of a support structure 205, which support structure comprises a support frame 212 and a support axle 213. Of the support axle 213 one end is shown. The support axle 213 extends through the axial opening 211 provided in the wheel hub 208. The ends of the support axle 213 extend outside the wheel hub 211, and are supported by the support frame 212. The support axle 213 is fixed to the support frame 212. Thus, in contrast with the embodiment shown in FIG. 2, the support axle 113 of the embodiment shown in FIG. 3 can not be rotated relative to the support frame 212.

In the embodiment shown in FIG. 3, first bearings 214 are provided at opposite ends of the wheel hub 208 and between the wheel hub 208 and the support axle 213, to rotatably support the wheel hub on the support axle and thus enable rotational movement of the wheel about its rotational axis. The first bearings 214 of the embodiment shown in FIG. 3 are thus provided at roughly the same location as the first bearings 114 of the embodiment shown in FIG. 2.

The second bearings 215 of the embodiment shown in FIG. 3 are each provided between the wheel hub 208 and the support axle 213 and between one of the first bearings 214 and the wheel hub 208, such that they support the wheel hub and in turn are supported by the first bearings.

In the particular embodiment shown, the two second bearings are each provided concentric with the first bearings, and the first bearings outer rings and the second bearings inner rings are combined into intermediate bearing rings.

Furthermore, in the particular embodiment shown the first bearings 214 are each provided with a first bearing locking mechanism 216 comprising a flange 217. The flanges 217, of which one is shown, are each provided on the support axle 213 adjacent a first bearing 214, more in particular between the support frame 212 and the first bearing 214.

Each flange 217 has a disc shaped flange body provided with openings along its outer circumference, which openings are configured for receiving pins in a direction substantially parallel to the rotational axis of the hub 208. The openings provided in the flange body 217 correspond with openings in the first bearing outer ring 214B, and thus in the particular embodiment shown correspond with openings in the intermediate bearing ring.

The first bearing locking mechanism furthermore comprises pins, which pins can be inserted in the openings of the flange body such that they engage the corresponding openings in the first bearing outer ring. By inserting the pins into the openings of the flange body and of the first bearing outer ring, the first bearing is converted from its unlocking condition into its locking condition. Inserting the bolts in the flange openings and the corresponding openings of the first bearings outer ring thus blocks rotational movement of the first bearing outer ring, and thus of the intermediate bearing ring, relative to the first bearing inner ring, but also rotational movement of the first bearing outer ring, and thus of the intermediate bearing ring, relative to the support axle 213.

It is noted that in the particular embodiment shown the openings for receiving the pins of the bearing locking mechanism are provided in the first bearing outer ring, which is part of the intermediate bearing ring. Alternatively, the openings can be provided in another section of the intermediate bearing ring, for example in the second bearing inner ring.

The second bearings 215 are also provided with a second bearing locking mechanism 218 in the form of a flange 219. The flanges 219, of which one is shown, are each provided on the inside of the wheel hub 208 adjacent a second bearing 214 and are attached to the second bearing inner ring. The flange 217 is provided with openings, which openings correspond with openings in the hub. The locking mechanism furthermore comprises bolts, which bolts can be inserted in the openings of the hub, such that they engage the corresponding openings in the flange. By inserting the bolts into the openings of both the hub and the flange, the second bearing locking mechanism is converted from its unlocking condition into its locking condition.

The second bearing locking mechanism thus can be used to block rotational movement of the second bearing inner ring relative to the second bearing outer ring, and thus rotation of the wheel hub about the intermediate bearing rings. On the other hand, in its unlocking condition, the second bearing locking mechanism enables rotational movement of the second bearing inner ring relative to the second bearing outer ring, and thus rotational movement of the wheel about its rotational axis when the first bearing locking mechanisms are in their locking condition.

Thus, in the particular embodiment shown, the wheel hub 208 is rotatably supported on the support axle 213, via first bearings 214 and second bearings 215. By providing the wheel with a hub which is rotatably supported according to the invention on the support axle, the wheel can be rotated when the first or the second bearings are locked. Thus, in practice the first or second bearings are used during normal operation and thus function as the main bearings. The other bearings are only used when there is a problem with the main bearings, and thus function as auxiliary bearings or back up bearings.

Alternatively, for example an intermediate hub can be provided between the first bearing and the second bearings, such that it is connected with the intermediate bearing rings. In such an embodiment, for example the first bearing are provided between the support axle and the intermediate hub, and the second bearings are provided between the intermediate hub and the main hub of the wheel, which main wheel is connected with the spokes to support the rim of the wheel. In a further embodiment with an intermediate hub, the first and second bearings can be provided staggered relative to each other, such that the first bearings are located close to the central plane of the wheel while the second bearings are located farther away of that plane, or visa versa. Further configurations are also possible.

Figure 4:
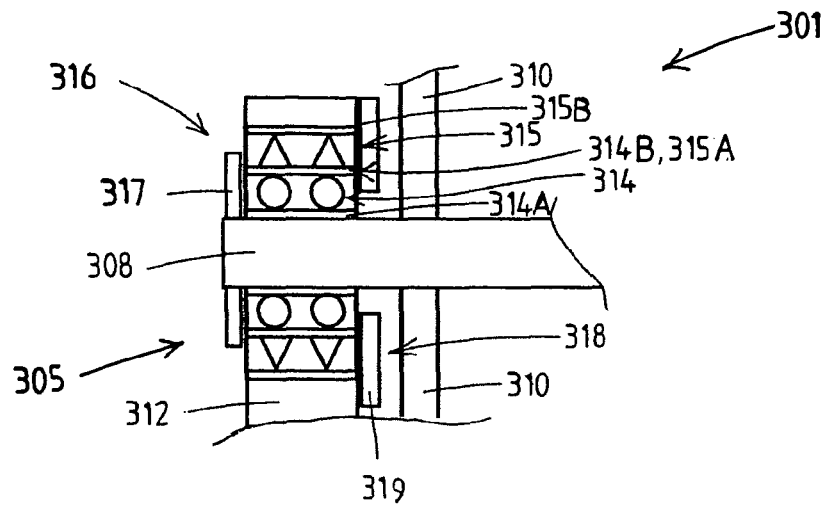
FIG. 4 shows a schematic view in cross section of a first and second bearing of a third embodiment of an observation wheel type ride according to the invention.

FIG. 4 shows a detail in cross section of an embodiment of an observation wheel type ride 301 similar to the one shown in FIG. 1. More in particular, FIG. 4 shows a third configuration of first and second bearings according to the invention. It is noted that the configuration of the bearings can also be applied in other types of observation wheels than the one shown in FIG. 1.

The particular embodiment shown in FIG. 4 comprises a wheel, which wheel is provided with a wheel hub 308. The figure shows a section of the wheel, more in particular an end of a wheel hub 308, and the ends of two wheel spokes 310 connected with the wheel hub 308. FIG. 4 furthermore shows an upper end of a support structure 305, which support structure comprises a support frame 312. The ends of the wheel hub 308 are supported by the support frame 312.

Thus, in contrast with the embodiment shown in FIGS. 1 and 2, the support structure is not provided with a support axle which extends through an axial opening of the hub of the wheel. Instead, the wheel hub is supported at opposite sides of the wheel by a support frame.

In the embodiment shown in FIG. 4, the first bearings 314 are provided at opposite ends of the wheel hub and are each provided between the wheel hub 308 and the support frame 312, more in particular within a second bearing 315. These second bearings are provided at opposite ends of the wheel hub and are also provided between the wheel hub 308 and the support frame 312, more in particular between one of the first bearings and a support structure 305, more in particular a support frame 312 of the support structure 305.

The first bearings 314 comprise a first bearing inner ring 314A and a first bearing outer ring 314B, and the second bearings 315 comprise a second bearing inner ring 315A and a second bearing outer ring 315B.

The first bearing inner ring 314A is fixed to the wheel hub 308, and the first bearing outer ring 314B is fixed to the second bearing inner ring 315A. The second bearing outer ring 115B is fixed to the support frame 312.

Thus, the first bearings 314 are each provided between the wheel hub 308 and the second bearings 315, and the second bearings 315 are each provided between the first bearings 314 and the support frame 312. The second bearings rotatably support the first bearings and thus the wheel hub on the support frame.

Furthermore, in the particular embodiment shown the first bearings 314 are provided with a first bearing locking mechanism 316 in the form of a flange 317. The flanges 317, of which one is shown, are each provided on the wheel hub 308 adjacent a first bearing 314. The flange 317 is provided with openings, which openings correspond with openings in the first bearing outer ring. The locking mechanism furthermore comprises bolts, which bolts can be inserted in the openings of the flange, such that they engage the corresponding openings in the first bearing outer ring. By inserting the bolts into the openings of both the flange and the first bearing outer ring, the first bearing locking mechanism is converted from its unlocking condition into its locking condition. Thus, rotational movement of the first bearing outer ring relative to the wheel hub can be blocked.

Alternatively, the flange can be provided on the first bearings outer ring and be provided with openings for receiving bolts which openings correspond with openings in the hub. Other embodiments of a locking mechanism can also be used.

Furthermore, in the particular embodiment shown the second bearings 315 are provided with a second bearing locking mechanism 318 in the form of a flange 318. The flanges 318, of which one is shown, are each fixed to the second bearing inner ring. In the embodiment shown they have a circular form and are provided adjacent the second bearing 315. The flange 318 is provided with openings, which opening corresponds with openings in the support frame 312. The locking mechanism furthermore comprises bolts, which bolts can be inserted through the openings of the flange, such that they engage the corresponding openings in the support frame. By inserting the bolts into the openings, the second bearing is converted from its unlocking condition into its locking condition.

Since the second bearing outer ring 315B is fixed to the support frame 312 inserting the bolts blocks rotational movement of the second bearing inner ring relative to the second bearing outer ring, and thus also rotational movement of the second bearing inner ring relative to the support frame.

Thus, according to the invention, both the first bearings 314 and the second bearings 315 enable rotational movement of the wheel about its rotational axis. When the first bearing locking mechanisms are in their locking condition, the wheel can be rotated using the second bearings, provided the second bearing locking mechanisms are in their unlocked condition, and when the second bearing locking mechanisms are in their locking condition, the wheel can be rotated using the first bearings, provided the first bearing locking mechanism are in their unlocked condition.

Figure 5:
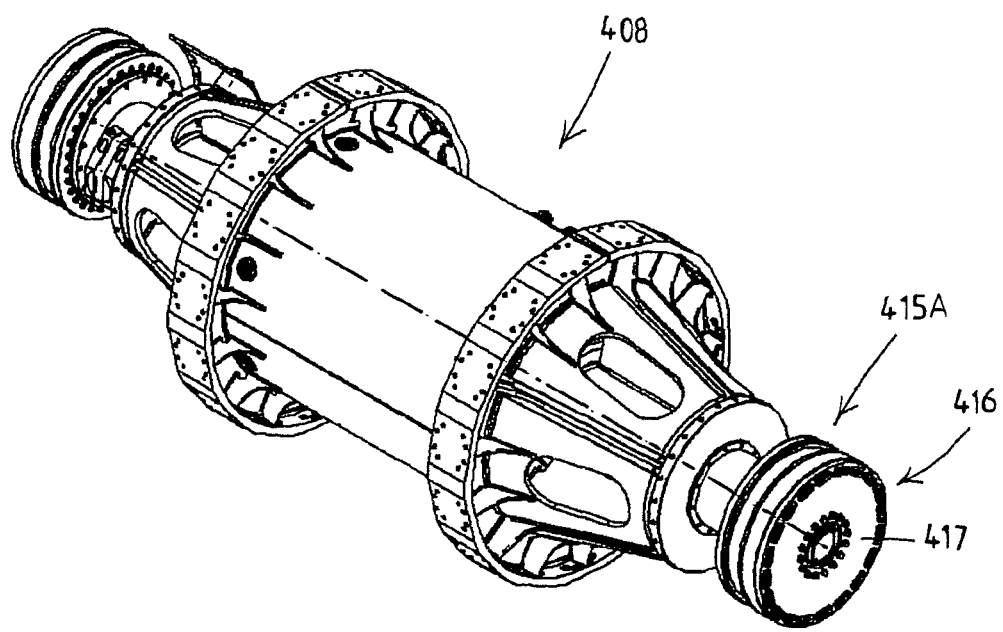
FIG. 5 shows a perspective view in detail of a hub of an observation type ride in which the bearings are configured similar to the one of the hub shown in FIG. 4.

FIG. 5 shows a perspective view in detail of a hub 408 of an observation type ride in which the bearings are configured similar to the one of the hub 308 shown in FIG. 4. The hub 408 functions as the shaft of observation wheel type ride, for example an observation wheel type ride as shown in FIG. 1. The shaft of the wheel consists of three sections, namely one intermediate section and two lateral sections securely interconnected by suitable flanged discs. The central section is provided with two flanges for mounting the spokes of the wheel to the hub. Thus, the hub extends on opposites sides of the wheel.

Both the first bearings 414 and second bearings 415 are provided at opposite ends of the wheel hub 408, more in particular at the ends of the lateral sections of the hub. The first bearings 414 are provide concentric with, and in the same plane as the second bearings 415.

Figure 6:
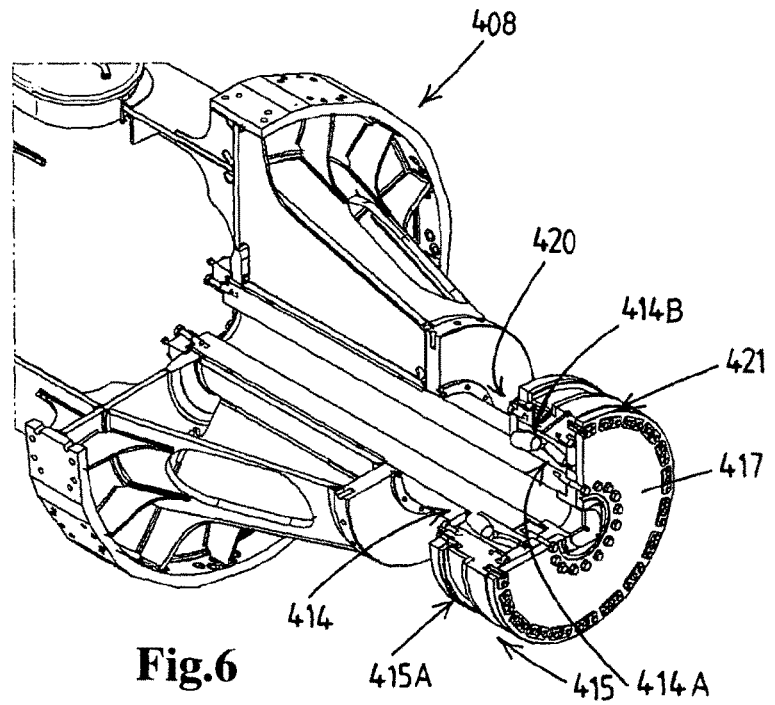
FIG. 6 shows the hub of FIG. 5 in partial cross section.

FIG. 5 shows an inner bearing ring 415A of the second bearing only. FIG. 6 shows part of the hub 408 and the bearings 414, 415 in cross section. Similar to the configuration shown in FIG. 4, at each end of the hub 408 a first bearing 414 is provide on the hub and a second bearings 415 is provided around the first bearings, such that the first and second bearings are combined in a composed bearings with an intermediate bearing ring 420.

A first bearing locking mechanism 416 is provided in the form of a flange 417, which flange is fixed to the end of the hub 408. The flange 417 extends in the radial direction along the first bearing inner ring 414A, the first bearing outer ring 414B and the second bearing inner ring 415A. The flange 417 is provided with openings 421 that correspond with openings in the second bearing inner ring 415A, which second bearing inner ring is fixed to the first bearing outer ring 414B such that they are combined in the intermediate bearing ring 420. When the openings of the flange 417 are lined up with the corresponding openings of the intermediate bearing ring 420, bolts can be inserted in the openings in the flange and intermediate bearing ring to fix the intermediate bearing ring and thus block rotation of the first bearing outer ring 414B about the first bearing inner ring 414 A.

Thus, the first bearing locking mechanism 416 can selectively be converted between a locking condition, in which it prevents rotational movement of the first bearing inner ring relative to the first bearing outer ring, and an unlocking condition, in which it allows for rotational movement of the first bearing inner ring relative to the first bearing outer ring.

Figure 7:
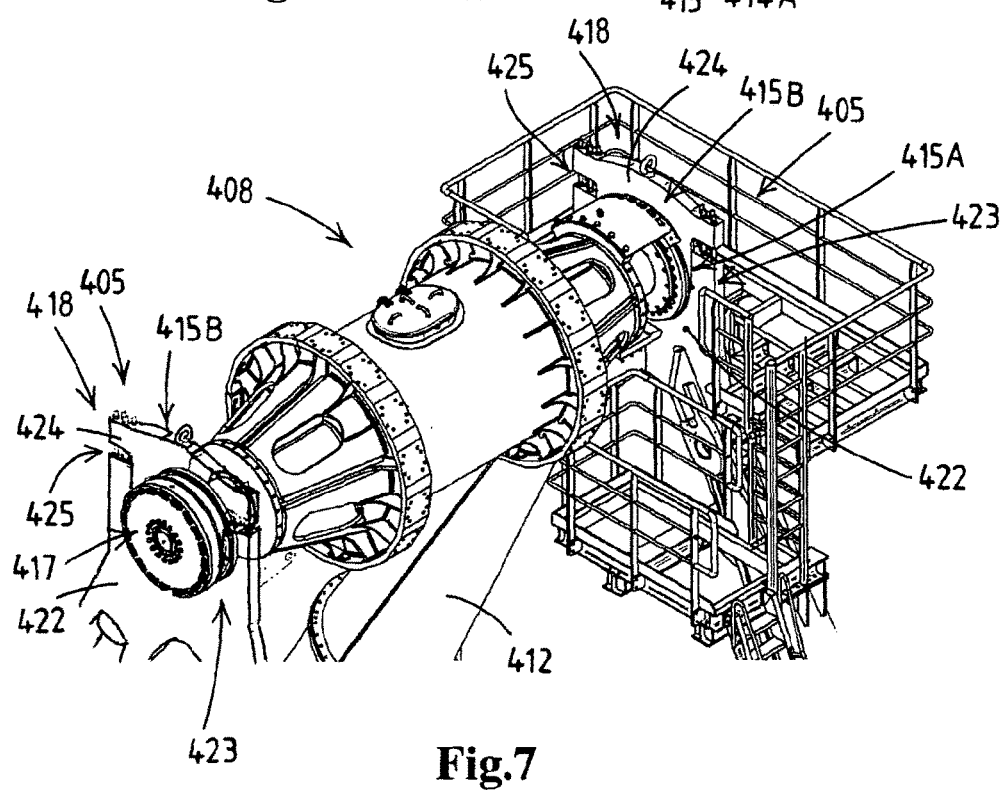

FIG. 7 shows the hub 408 positioned on a support structure 405, which in the particular embodiment shown comprises two sets of multiple pylons 412 supporting a cradle 422. The hub rests with its ends, more in particular the second bearings inner ring, in the cradles. The second bearings outer ring, or at least a part thereof, is fixed to the cradles. The load bearing support structure 405 transfers the load of the entire wheel, together with that of the hub, the spokes and the cabins onto the foundations of the pylons 412. The top side of the hub is engaged by a clamp section 424, which is fixed to the cradle with bolts. It is noted that the front cradle and clamp section are shown in see through, such that the hub is fully visible.

Thus, the first bearings are provided between the wheel hub and the support frame, to rotatably support the wheel hub on the support frame and thus enable rotational movement of the wheel about its rotational axis, and the second bearings are provided between one of the first bearings and the support frame, such that the rotatably support the first bearings and thus the wheel hub on the support frame, to thus enable rotational movement of the wheel about its rotational axis when the first bearing locking mechanisms are in their locking condition.

In the embodiment shown in FIGS. 5-7, the first bearings 414 are rolling bearings, for rotating the wheel during normal use, and the second bearings 415 are friction bearings for rotating the wheel when one or both of the rolling bearings break(s) down.

Furthermore, in the embodiment shown in FIGS. 5-7 the second bearings outer rings 415B each comprise a semi ring support section 423, which is part of the support structure 405 for rotatably supporting the second bearing inner rings, and a semi ring clamp section 424, which is part of a second bearing locking mechanism 418. In the particular embodiment shown, the semi ring support sections 423 are combined with the cradles 422, and thus support the hub. The semi ring clamp sections engage the upper half of the second bearing inner ring.

In addition to the semi ring support section 423 and the semi ring clamp section 424, the second bearing locking mechanism 418 further comprises clamping devices 425 for pulling the semi ring clamp section 424 towards the semi ring support section 423 to clamp the second bearing inner ring 415A between the semi ring clamp section 424 and the semi ring support section 423 and to thus block rotation of the second bearing inner ring 415A relative to the second bearing outer ring 415B. In the particular embodiment shown, the clamping device 425 is provided with bolts. It is noted that other type of clamping devices can also be used to clamp the semi ring clamp section 424 onto the cradle 422, more in particular onto the semi ring support section 423 provided in that cradle.

In the embodiment shown, the second bearings outer ring comprises essentially two halves, one lower half for rotatably supporting the second bearing inner ring, and an upper half, which can be used for clamping the second bearing inner ring to prevent movement of the second bearing inner ring relative to the second bearing outer ring. Thus, the second bearing blocking mechanism is at least partially integrated with the second bearings, which allows for a compact configuration of the combined second bearing and second bearing locking mechanism.

By providing observation wheel type rides according to the invention, i.e. observation wheel type ride with first and second bearings, the invention allows for two use profiles, i.e. normal use profile and emergency use profile.

With the normal use profile, rotation of for example the second bearings relative to the support structure is blocked, and the wheel is rotatably supported by the first bearings. With the emergency use profile, rotation of the inner bearing ring relative to the outer bearing ring is blocked, and the wheel is rotatably supported by the friction bearing.

The invention allows for evacuating passengers from passenger cabins of an observation wheel type ride when one or more of the first bearings fail, by using the second bearings to rotate the wheel, and thus bring the passenger cabins to the station in which the passengers can disembark.

To enable controlled rotation of the heel, the first and second bearings are provided with locking mechanisms, for blocking rotational movement of the bearings. Preferably, when the first bearings are used for rotating the wheel, the second bearings are locked, and when the second bearings are used for rotating the wheel the first bearings are locked.

Preferably one, either the first or second bearings, are used as the main bearings, while the other bearings are used as auxiliary or back up bearings. Preferably, the main bearings are roller bearings while the backup bearings are provided in the form of friction bearings.

With an observation wheel type ride according to the invention, the wheel is rotated about its rotational axis using for example the first bearings to enable rotational movement of the wheel, with the first bearing locking mechanism in its unlocking condition and the second bearing locking mechanism in its locking condition.

When one or both of the first bearings fail, rotating the wheel about its rotational axis is stopped. The second bearing locking mechanisms are converted from their locking condition, in which they prevent rotational movement of the second bearing inner rings relative to the second bearing outer rings, into their unlocking condition, in which they allow for rotational movement of the second bearing inner rings relative to the second bearing outer rings.

If necessary, the wheel is rotated about its rotational axis, to correctly position the first bearing locking mechanisms for converting them from their unlocking condition, into their locking condition. The first bearing locking mechanisms are converted from their unlocking condition, in which they allow for rotational movement of the first bearing inner rings relative to the first bearing outer rings, into their locking condition, in which they prevent rotational movement of the first bearing inner rings relative to the first bearing outer rings.

Subsequently, the wheel is rotated about its rotational axis, to bring the passenger cabins in a position for evacuating passengers from the cabins, using the second bearings to enable rotational movement of the wheel.

It is observed that a rolling bearing, also known as rolling-element bearing is a bearing which carries a load by placing rolling elements (such as balls or rollers) between two bearing rings. The relative motion of the pieces causes the round elements to roll with very little rolling resistance and with little sliding. Preferably, the main bearings according to the invention are rolling bearings It is furthermore observed that a friction bearing, also known as plain bearing, is a simplest type of bearing, comprising just a bearing surface and no rolling elements. Therefore essentially the journal, i.e. the part of the shaft in contact with the bearing, slides over the bearing surface. Plain bearings, in general, are the least expensive type of bearing and they have a high load-carrying capacity. Preferably, the auxiliary bearings according to the invention are plain or friction bearings.

Other variations to the disclosed embodiments can be understood and effected by those skilled in the art in practicing the claimed invention, from study of the drawings, the disclosure, and the appended claims. In the claims, the word "comprising" does not exclude other elements or steps, and the indefinite article "a" or "an" does not exclude a plurality. The mere act that certain measures are recited in mutually different dependent claims does not indicate that a combination of these measured cannot be used to advantage. Any reference signs in the claims should not be construed as limiting the scope.

The invention is thus by no means limited to the exemplary embodiment described herein above, but comprises various modifications hereto, in so far as they fall within the scope of the claims.

The invention claimed is:

1. An observation wheel type ride, comprising:
    a wheel, comprising:
        a wheel rim;
        a wheel hub, wherein the wheel hub has a rotational axis which coincides with a rotational axis of the wheel and has an axial opening; and
        wheel spokes that extend between the wheel hub and the wheel rim in a radial direction;
    multiple passenger cabins, wherein said passenger cabins are supported by the wheel;
    a drive mechanism configured for rotating the wheel about its rotational axis;
    a support structure comprising a support frame and a support axle, wherein the support axle extends through said axial opening provided in the wheel hub and is supported by the support frame and wherein the support structure supports the wheel;
    two first bearings, the two first bearings each comprising an inner bearing ring and an outer bearing ring, and wherein two first bearings enable rotational movement of the wheel about its rotational axis, and wherein the first bearings are provided at opposite ends of the wheel hub and between the wheel hub and the support axle to rotatably support the wheel hub on the support axle and thus enable rotational movement of the wheel about its rotational axis;
    a first bearing locking mechanism for each first bearing, said first bearing locking mechanism can selectively be converted between a locking condition, in which the first bearing locking mechanism prevents rotational movement of the first bearing inner bearing ring relative to the first bearing outer bearing ring, and an unlocking condition, in which the first bearing locking mechanism allows for rotational movement of the first bearing inner bearing ring relative to the first bearing outer bearing ring;
    two second bearings, the second bearings are friction bearings and are each provided between the support axle and the support frame to rotatably support the support axle on the support frame, and thus enable rotational movement of the wheel about its rotational axis when the first bearing locking mechanisms are in their locking condition, wherein the second bearings each comprise an inner bearing ring and an outer bearing ring or outer bearing semi ring; and
    a second bearing locking mechanism for each second bearing, wherein the second bearing locking mechanism can selectively be converted between a locking condition, in which the second bearing locking mechanism prevents rotational movement of the second bearing inner bearing ring relative to the second bearing outer bearing ring, and an unlocking condition, in which the second bearing locking mechanism allows for rotational movement of the second bearing inner bearing ring relative to the second bearing outer bearing ring,
    wherein the second bearings outer bearing rings each comprise a semi ring support section that is part of the support structure for rotatably supporting the second bearing inner bearing rings, and a semi ring clamp section that is part of the second bearing locking mechanism, and
    wherein the locking mechanism further comprises clamping devices for pulling the semi ring clamp section towards the semi ring support section to clamp the second bearing inner bearing ring between the clamp section and the support section and to thus block rotation of the second bearing inner bearing ring relative to the second bearing outer bearing ring.

2. The observation wheel according to claim 1, wherein the two second bearings are each provided concentric with the first bearings, and wherein the first bearings outer bearing rings and the second bearings inner bearing rings are combined into intermediate bearing rings.

3. The observation wheel according to claim 1, wherein the first bearings are rolling bearings, for rotating the wheel during normal use, and the second bearings are for rotating the wheel when one or both of the rolling bearings break(s) down.

4. The observation wheel according to claim 1, wherein the first bearing locking mechanism comprises a flange provided on the support axle, said flange extends in a radial direction adjacent the first bearing, and can be fixed to the first bearing outer bearing ring to block rotational movement of that first bearing outer bearing ring relative to the support axle.

5. A method for providing an evacuation modus for an observation wheel type ride, the method comprising:
    providing an observation wheel type ride according to claim 1;

using the first or the second bearings as main bearings, and the other bearings as auxiliary bearings rotating the wheel about its rotational axis using the main bearings, with the bearing locking mechanisms of the main bearings in their unlocking condition and the bearing locking mechanisms of the auxiliary bearings in their locking condition, thus using the main bearings to enable rotational movement of the wheel;

when at least one of the main bearings fails, providing an evacuation modus by:

optionally: rotating the wheel about its rotational axis to correctly position the main bearing locking mechanism of at least the main first bearing for converting it from its unlocking condition into its locking condition;

stop rotating the wheel about its rotational axis;

converting at least the main bearing locking mechanism of the failed main bearing from its unlocking condition, in which it allows for rotational movement of the main bearing inner bearing ring relative to the main bearing outer bearing ring, into its locking condition, in which it prevents rotational movement of the main bearing inner bearing ring relative to the main bearing outer bearing ring;

converting at least the auxiliary bearing locking mechanism of the auxiliary bearing associated with the failed main bearing from its locking condition, in which it prevents rotational movement of the auxiliary bearing inner bearing ring relative to the auxiliary bearing outer bearing ring, into its unlocking condition, in which it allows for rotational movement of the auxiliary bearing inner bearing ring relative to the auxiliary bearing outer bearing ring; and in the evacuation modus, rotating the wheel about its rotational axis to bring the passenger cabins in a position for evacuating passengers from the cabins, using one or both auxiliary bearings to enable rotational movement of the wheel.

6. The observation wheel according to claim 1, wherein one of the inner bearings and one of the outer bearings are provided concentric and in a common plane.

7. An observation wheel type ride, comprising:

a wheel comprising:
 a wheel rim;
 a wheel hub, wherein the wheel hub has a rotational axis which coincides with a rotational axis of the wheel; and
 wheel spokes that extend between the wheel hub and the wheel rim in a radial direction;

multiple passenger cabins, wherein the multiple passenger cabins are supported by the wheel;

a drive mechanism configured for rotating the wheel about its rotational axis;

a support structure, wherein the support structure supports the wheel;

two first bearings, the two first bearings each comprising an inner bearing ring and an outer bearing ring, and wherein the two first bearings enable rotational movement of the wheel about its rotational axis;

a first bearing locking mechanism for each first bearing, wherein the first bearing locking mechanism can selectively be converted between a locking condition, in which the first bearing locking mechanism prevents rotational movement of the first bearing inner bearing ring relative to the first bearing outer bearing ring, and an unlocking condition, in which the first bearing locking mechanism allows for rotational movement of the first bearing inner bearing ring relative to the first bearing outer bearing ring;

two second bearings, wherein the second bearing are friction bearings and each comprise an inner bearing ring and an outer bearing ring or outer bearing semi ring, and wherein the second bearings enable rotational movement of the wheel about a rotational axis thereof when the first bearing locking mechanisms are in their locking condition; and a second bearing locking mechanism for each second bearing, wherein the second bearing locking mechanism can selectively be converted between a locking condition, in which the second bearing locking mechanism prevents rotational movement of the second bearing inner bearing ring relative to the second bearing outer bearing ring, and an unlocking condition, in which the second bearing locking mechanism allows for rotational movement of the second bearing inner bearing ring relative to the second bearing outer bearing ring, wherein the wheel hub extends on opposites sides of the wheel, wherein the support structure comprises a support frame, wherein the support frame supports opposites ends of the wheel hub;

wherein the first bearings are provided at opposite ends of the wheel hub and between the wheel hub and the support frame, to rotatably support the wheel hub on the support frame and thus enable rotational movement of the wheel about its rotational axis;

wherein the second bearings are provided at opposite ends of the wheel hub and between one of the first bearings and the support frame, such that the rotatably support the first bearings and thus the wheel hub on the support frame, to thus enable rotational movement of the wheel about its rotational axis when the first bearing locking mechanisms are in their locking condition, wherein the two second bearings are each provided concentric with the first bearings, wherein the first bearings outer rings and the second bearings inner rings are combined into intermediate bearing rings, wherein the second bearings outer bearing rings each comprise a semi ring support section, which is part of the support structure for rotatably supporting the second bearing inner bearing rings, and a semi ring clamp section, which is part of the second bearing locking mechanism, and wherein the locking mechanism further comprises clamping devices for pulling the semi ring clamp section towards the semi ring support section to clamp the second bearing inner bearing ring between the clamp section and the support section and to thus block rotation of the second bearing inner bearing ring relative to the second bearing outer bearing ring.

8. The observation wheel according to claim 7, wherein the two second bearings are each provided concentric with the first bearings, and wherein the first bearings outer bearing rings and the second bearings inner bearing rings are combined into intermediate bearing rings.

9. The observation wheel according to claim 7, wherein the first bearings are rolling bearings, for rotating the wheel during normal use, and the second bearings are for rotating the wheel when one or both of the rolling bearings break(s) down.

10. The observation wheel according to claim 7, wherein the first bearing locking mechanism comprises a flange provided on the support axle, said flange extends in a radial direction adjacent the first bearing, and can be fixed to the first bearing outer bearing ring to block rotational movement of that first bearing outer bearing ring relative to the support axle.

11. The observation wheel according to claim 7, wherein one of the inner bearings and one of the outer bearings are provided concentric and in a common plane.

\* \* \* \* \*